United States Patent
Schwartz et al.

(10) Patent No.: US 6,473,758 B1
(45) Date of Patent: Oct. 29, 2002

(54) METHOD AND APPARATUS FOR PRIVATE AND RESTRICTED-USE ELECTRONIC ADDRESSES

(75) Inventors: Todd A. Schwartz, Portland; Vaughn S. Iverson, Beaverton, both of OR (US)

(73) Assignee: Intel Corporation, Santa Clara, CA (US)

( * ) Notice: Subject to any disclaimer, the term of this patent is extended or adjusted under 35 U.S.C. 154(b) by 176 days.

(21) Appl. No.: 09/604,845

(22) Filed: Jun. 27, 2000

(51) Int. Cl.[7] .............................................. G06F 17/30
(52) U.S. Cl. ......................................................... 707/9
(58) Field of Search ................................ 709/229, 218, 709/227; 713/200, 201; 380/201, 173, 25; 707/104.1, 12, 10, 104, 9

(56) References Cited

U.S. PATENT DOCUMENTS

| | | | | |
|---|---|---|---|---|
| 5,604,803 A | * | 2/1997 | Aziz ........................... | 709/228 |
| 5,634,053 A | * | 5/1997 | Noble et al. ................... | 707/4 |
| 5,935,246 A | * | 8/1999 | Benson ........................ | 713/200 |
| 6,091,835 A | * | 7/2000 | Smithies et al. ............ | 340/5.86 |
| 6,119,229 A | * | 9/2000 | Martinez et al. ............. | 713/200 |
| 6,226,750 B1 | * | 5/2001 | Trieger ........................ | 380/264 |
| 6,321,267 B1 | * | 11/2001 | Donaldson ................... | 370/351 |
| 6,347,358 B1 | * | 2/2002 | Kuwata ....................... | 711/113 |
| 6,356,936 B1 | * | 3/2002 | Donoho et al. ............. | 709/206 |

OTHER PUBLICATIONS

Proxy Mate Website: "Brief Overview": http://briefoverview.htm#spam, 1999.

* cited by examiner

Primary Examiner—Wayne Amsbury
Assistant Examiner—Sana Al-Hashemi
(74) Attorney, Agent, or Firm—Fish & Richardson P.C.

(57) ABSTRACT

A filter for restricting access to a user's destination to authorized senders. The filter generates a unique address identification (ID) for each authorized sender. The address ID may be formatted into a unique address by associating with a machine address. The address IDs are stored in a database along with information identifying the sender to which it was issued. The user may revoke a sender's authorization by removing the address ID from the database, or restrict access with policies associated with the address ID.

33 Claims, 4 Drawing Sheets

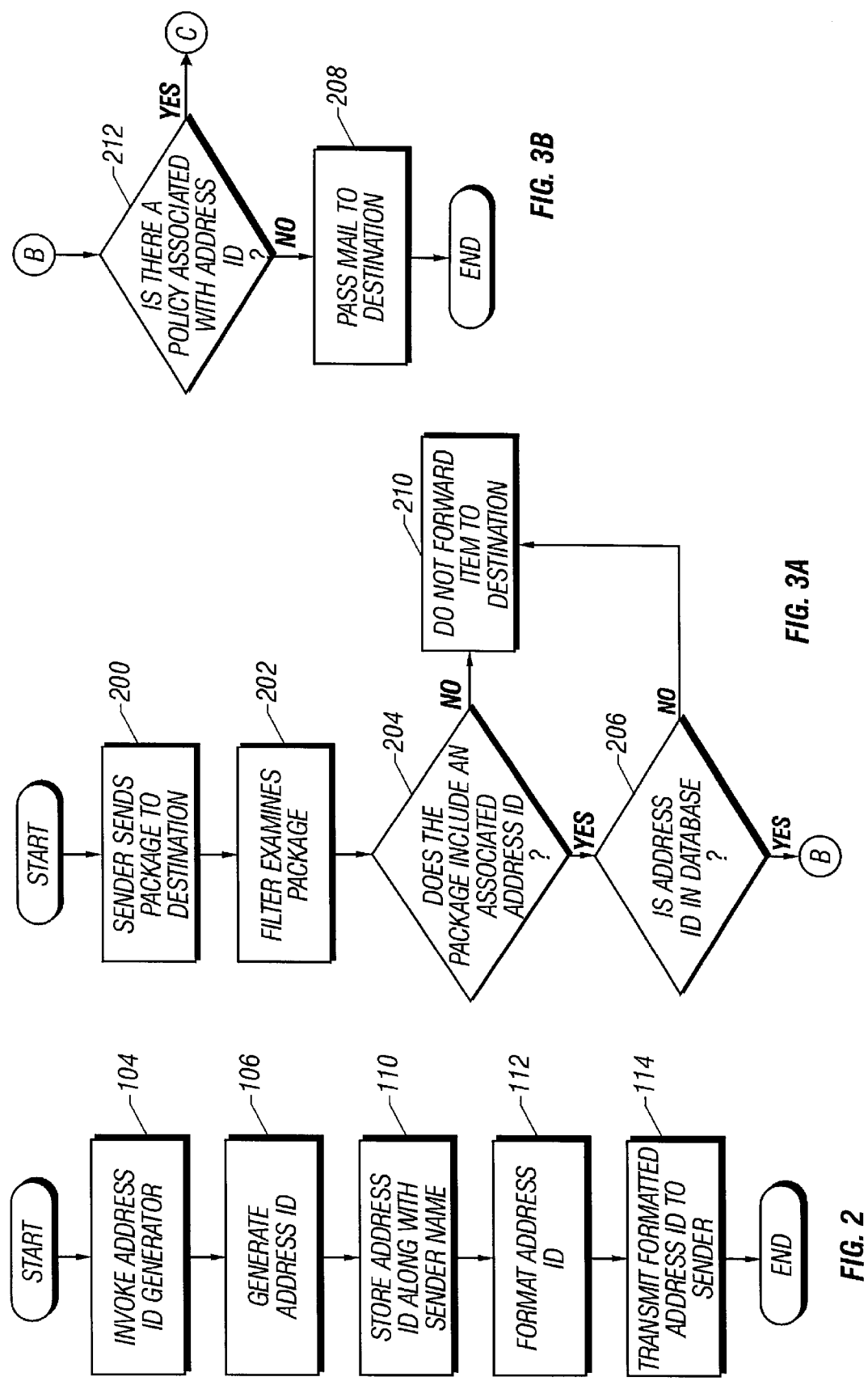

| Sender | Address ID | Issued | Policy | No. of Uses | Machine Restr. | Domain Restr. | Encrypt. |
|---|---|---|---|---|---|---|---|
| Mom | U90L38D7CD4DE432DS | 3/10/00 | unrestricted | 10 | N | N | N |
| www.brd.com | (hidden) | 2/9/00 | 3 uses remain | 2 | N | Y | N |
| Runner's World | (hidden) | 1/12/00 | update | 3 | N | N | N |
| Bike chat | (hidden) | 2/15/00 | single use | 0 | N | N | N |
| Brad | (hidden) | 1/7/00 | suspended | 15 | Y | N | N |

*FIG. 4*

METHOD AND APPARATUS FOR PRIVATE AND RESTRICTED-USE ELECTRONIC ADDRESSES

BACKGROUND

In electronic delivery systems, as in physical mail systems, a recipient's destination is generally identified by a fixed address. A problem with fixed addresses is that they are accessible to anyone with knowledge of the address. Knowledge of a fixed address permits a sender to use that address as a destination without the destination owner's permission.

When an undesirable sender obtains a fixed address, the recipient has two options for dealing with it: filtering out unwanted items, or moving to a new address. However, filtering unwanted item is rarely perfect. The efficacy of a filter depends on the nature of the screening criteria. If the criteria are too specific, unwanted items may be mistakenly passed through, and if the criteria are too general, desired items may be mistakenly filtered. Changing a fixed address is even more inconvenient, because it inevitably requires the destination owner to inform all desired senders of the new address.

Another problem with fixed addresses is that they are fully transferable to any third party, along with the implied permission to transmit digital content intact to the address. The recipient has no control over this transferability, and therefore any transfers give the transferee the same ability to deliver items without restriction.

DESCRIPTION OF DRAWINGS

FIG. 2 is a flowchart illustrating the creation of a unique address according to an embodiment.

FIGS. 3A and 3B are flowcharts illustrating filtering transmitted items according to an embodiment.

FIG. 4 is an authorization management screen according to an embodiment.

Like reference symbols in the various drawings indicate like elements.

DETAILED DESCRIPTION

According to an embodiment, the owner of a destination may create a unique address for each potential sender of digital content. This gives the destination owner a direct and flexible control of unauthorized content being sent to that destination.

Figure 1:
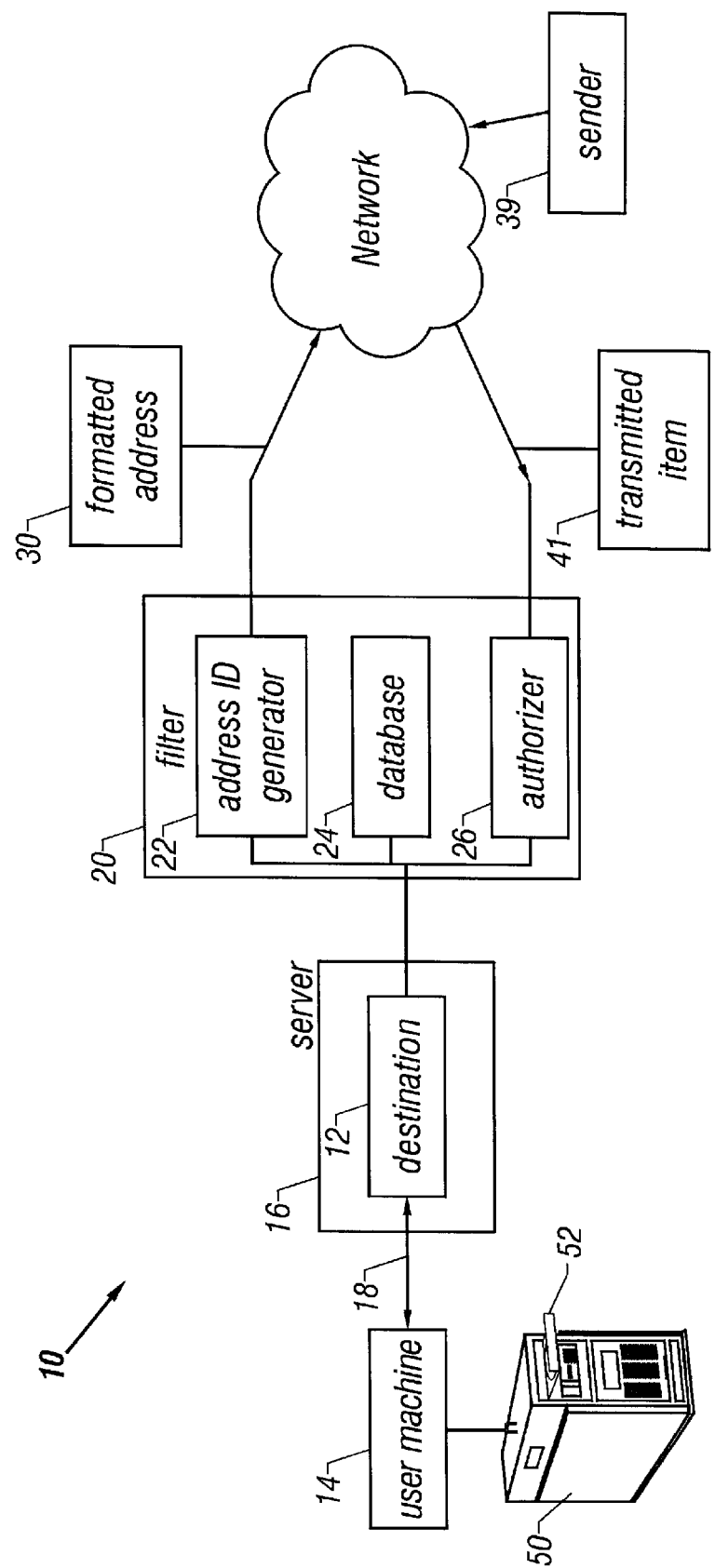
FIG. 1 is a schematic diagram of a delivery system according to an embodiment.

FIG. 1 illustrates a delivery system 10 according to an embodiment. The destination owner, hereinafter referred to as the "user," has a destination 12. The destination 12 may be an allocated memory space on a storage device such as a hard disk drive. The storage device may be on the user's machine 14, or on a remote proxy machine, such as a server 16 which manages the destinations of many users. In order to access a delivered item, the user logs on to the server over a network link 18. The user may check what is stored in the destination and then decide whether or not to download it to his own machine.

The item to be delivered to the destination 12 may be an electronic mail (e-mail) or an electronic package. An electronic package may simulate a physical package in which content is displayed and stored, for example, an electronic album. The electronic package may comprise several discrete modules. For example, the electronic album may include modules containing individual music tracks, as well as modules containing liner notes and cover artwork. The item transmitted by the sender may be a template for such an electronic package. The template may include descriptions of the modules comprising the package and addresses at which the user's machine, or a remote agent, may retrieve the individual modules. Thus, the modules of the electronic package may be individually accessible, unlike attachments to e-mail which tend to be bound to the e-mail message and delivered sequentially to a mailbox.

The user's destination 12 may be on a machine with a fixed base address. For example, a base address may be a Universal Resource Indicator (URI), an example of which is www.uspto.gov/web/menu/pats.html. Each section after a backslash ("/") identifies a more specific destination.

Access to the user's destination 12 is controlled by a filter 20. Filter includes an address identification (ID) generator 22, an address ID database 24, and an address ID authorizer 26. Filter 20 may reside on the user's machine 14 or on a proxy machine, for example, server 16. The filter may be embodied in software stored in a computer-readable medium, for example, a CD-ROM 52 in a drive connected to the user machine 14. Address ID generator 22 generates an address ID to be assigned to a particular sender 39. Database 24 links an address ID to a particular sender 39. Database 24 may store other type of information related to the address ID, such as policy information. Address ID authorizer 26 checks whether an address ID associated with a item 41 is valid.

When invoked, the address ID generator generates a relatively large random number for each potential sender or transaction. According to an embodiment, the address ID generator generates, for example, a 128-bit (16-byte) binary word. This number may be mapped to a character set. ASCII is one type of character set in which each character in the set is identified by 7-bit word. For example, in 7-bit ASCII, "G" is represented as "100 0111." Thus, a 128-bit word may be mapped onto an ASCII word 42 with 18 characters, utilizing 126 bits and disregarding 2 bits (see FIG. 4).

The user may access the address ID database 24 to manage the various address IDs and hence control the access of the associated senders to the user's destination. Since the address ID may be long and difficult to memorize, user management may be facilitated by mapping the address ID to the sender's name in some way.

According to one embodiment, the address ID is stored in address ID database 24 along with the sender name's for ease of identification and manipulation. The sender's name may be extracted from the sender's site or identification information in the header of a communication. Alternatively, the sender may be represented as a user-entered alias.

FIG. 2 illustrates an exemplary address ID assignment operation. To create a new address ID for a potential trusted sender 39, the user invokes the address ID generator 22 in block 104 which generates a random 128-bit word in block 106. The 128-bit word is mapped onto an ASCII word which is stored as an address ID in the address ID database 24 in block 110 along with the sender's name. The address ID 42 is formatted by associating the generated address ID with a base address. The unique formatted address for that particular sender is transmitted to the sender 39 in block 114.

According to an embodiment, the address ID may be formatted by combining the generated address ID with the base address for the destination 12. In a URI, the formatted address has the format "www.user.location.org/x/addressID", where "/x/" represents intermediary directories in the hierarchy of the address.

According to another embodiment, the address ID is hidden from the user and transmitted to the sender, separate from the base address, in a format recognized by the sender's machine as an address ID required to validate a delivery. The sender's machine automatically formats the address ID in the item, for example in a header portion, when sending the item 41 to the base address.

According to an embodiment, the address ID may be formatted by associating it with the address of the machine on which the filter resides, which, in this case, is not the user's machine. The formatted address ID may include information which identifies the destination 12 to the filter 20. Using this information, the filter may access the base address and forward authorized items to the destination 12.

As shown in FIG. 3, when any sender sends a item intended for the user's destination 12 in block 200, the filter 20 receives the item 41 and attempts to locate an address ID in a designated portion of the address or item 41 in block 202. The authorizer determines whether the item 41 includes an address ID in block 204. If the item does not include an address ID it is not forwarded to destination 12 in block 210.

If the item includes an address ID, address ID authorizer attempts to locate the particular address ID in the database in block 206. If the address ID is not in the database, the item 41 is not forwarded to the destination 12. According to the present embodiment, if the address ID is located in the database, item 41 is forwarded to the destination in block 208.

The user may revoke a previously authorized sender's ability to deliver items to the user destination 12 by removing the associated address ID from the address ID database. The user may wish to do this if, for example, the user is no longer interested in the types of items received from the sender. The user may also revoke access for abuses such as sending offensive materials or unauthorized transfers of the sender's address ID to a third party.

According to another embodiment, the presence of the address ID 42 in the database does not guarantee access. By providing sender-specific address IDs, the present embodiment provides the user a large degree of control and flexibility over others' ability to send to the user destination. Different senders may be given different levels of access based on policies suited to different commercial purposes and levels of trustworthiness.

FIG. 4 shows an address ID management screen 40 according to an embodiment of the invention. As the screen illustrates, database 24 includes information about the sender and some record of that sender's ability to send to the user destination 12. This information allows the user to set different policies for different senders and track access by a particular sender. This information may include, in addition to the address ID 42, sender's address 44, the sender name 46, sender alias 48, policy type 50, when the address ID was issued 52, and the number of times 54 the address ID was used.

According to this embodiment, when the address ID is found in the database, the policy corresponding to that address ID, and hence that sender, is checked in block 212 (FIG. 3B) and may be updated. The user may configure the filter to restrict access in various ways by revoking access permanently or temporarily based on different criteria.

The user may manually suspend access by the holder of a particular address ID by linking a suspend tag 56 to the address ID 42.

Figure 5B:
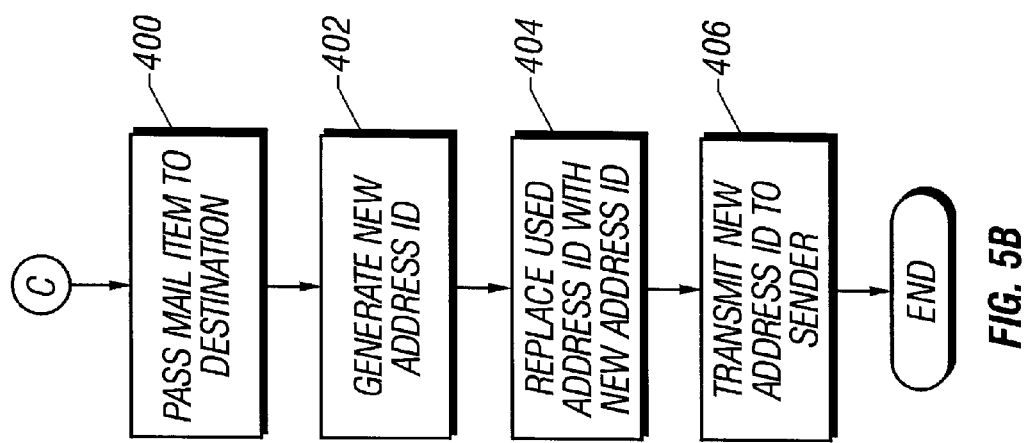
FIGS. 5A and 5B are flowcharts illustrating filtering transmitted items using sender-specific policies according to alternate embodiments of the invention.
Figure 5A:
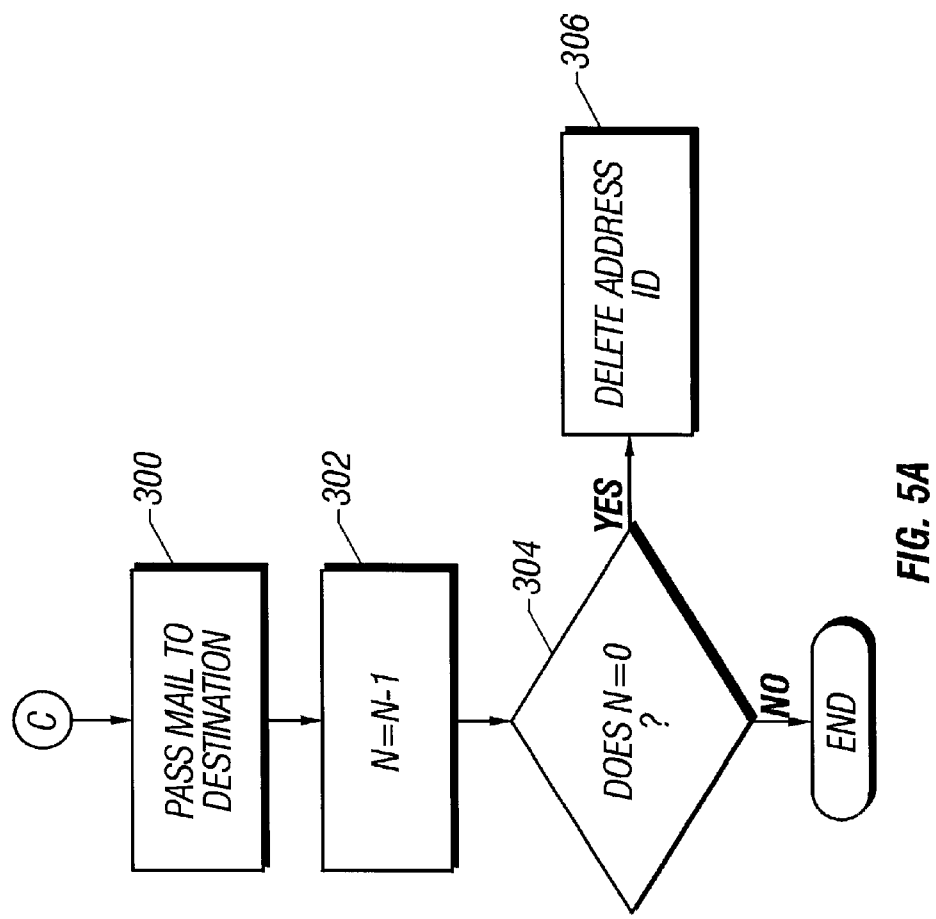

Address IDs may be set up for a limited number of uses, n, as shown in FIG. 5(*a*). For each item 41 received from a sender, the item 41 is passed to the destination 12 in block 300, and the sender's policy is decremented to (n−1) in block 302. If the filter 20 determines that n equals 0 in block 304, the address ID entry and related sender information is deleted from the file in block 306.

An address ID may be set up for single use (n=1). The first time the address ID is used, the item 41 is passed to the destination, but then the address ID 42 is deleted from the database. Such single use access is useful for one-time purchase transactions. It is also useful for providing anonymity when corresponding with unknown individuals or when posting an address on a site when nature of a response from other subscribers to the site is uncertain. Such anonymity is also useful to test response from a site when the purpose or trustworthiness of the site itself is questionable.

Address IDs may be updateable as shown in FIG. 5(*b*). The policy of the address ID is set for a one time use. Once a item 41 with the address ID 42 has been forwarded to the destination in block 400, the address ID is replaced with a new address ID in the database in blocks 402 and 404. The new address ID is automatically sent to the authorized sender in block 406. According to an embodiment, the authorized sender's machine is capable of automatically updating the sender's address ID database with the new address ID. Updated address IDs are useful when dealing with senders that tend to sell or otherwise make available recipient addresses to third parties. In that instance, the third party may use the address ID once, if the authorized sender has not used it first, but only the authorized sender would receive the updated address ID.

According to another embodiment, the filter 20 uses other information in the item 41 in addition to the address ID 42 to grant access. Authorization may be machine-specific 58 or domain-specific 60 (see FIG. 4), granting a sender access only if the authorizer recognizes the correct machine or domain information in the header information or elsewhere in the item 41. According to another embodiment, the message may be encrypted and require an encryption key 62 or digital signature in addition to a valid address ID order to be authorized.

As more content is consumed in digital format, and as such content is increasingly being bought, sold and delivered electronically, users will begin demanding better transaction security and more proactive ways to deal with unwanted messages. A delivery system according to an embodiment may give users the confidence to consume large amounts of digital content.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:

generating an address identification derived from a randomly generated number;

linking said address identification to a machine address identifying a machine;

transmitting the address identification, with the machine address, to an authorized sender;

storing said address identification with information identifying said authorized sender;

storing policy information associated with the authorized sender in a memory; and linking said policy information to the address identification.

2. The method of claim 1 wherein the machine comprises a filter.

3. The method of claim 1 wherein the memory comprises a database including a plurality of different address identifications.

4. The method of claim 1 further comprising:
receiving a transmitted item;
examining said transmitted item to locate the address identification;
in response to locating the address identification, forwarding the transmitted item to a destination; and
in response to not locating the address identification, not forwarding the transmitted item to the destination.

5. The method of claim 1, wherein the transmitted item comprises an electronic package.

6. The method of claim 1, wherein the transmitted item comprises information indentifying an electronic package.

7. A method comprising:
receiving a transmitted item from a sender;
extracting a first address identification from the transmitted item;
comparing the first address identification to a plurality of address identifications in a memory, each address identification being different, and each address identification having associated policy information; and
in response to not matching the first address identification to one of said plurality of address identifications, not forwarding the transmitted item to a destination.

8. The method of claim 7, wherein the transmitted item comprises an electronic package.

9. The method of claim 7, wherein the transmitted item comprises information indentifying an electronic package.

10. The method of claim 7 further comprising:
in response to matching the first address identification to one of said plurality of address identifications, identifying policy information associated with the first address identification.

11. The method of claim 10, wherein the policy information comprises a limited use number representing a number of authorized deliveries, and further comprising:
removing the first address identification from memory when the number of transmitted items received that include said first address identification equals said limited use number.

12. The method of claim 10, wherein the policy information comprises an update policy, and further comprising:
transmitting the transmitted item to a destination;
generating a second address identification;
replacing the first address identification in memory with said second address identification; and
transmitting said second address identification to the sender of the transmitted item.

13. The method of claim 10, wherein the policy information identifies a sender machine, and further comprising:
forwarding the transmitted item to the destination in response to locating information identifying said sender machine in the transmitted item.

14. The method of claim 10, wherein the policy information identifies a sender domain, and further comprising:
forwarding the transmitted item to the destination in response to locating information identifying said sender domain in the transmitted item.

15. The method of claim 10, wherein the policy information identifies a sender encryption key, and further comprising:
forwarding the transmitted item to the destination in response to locating said sender encryption key in the transmitted item.

16. An apparatus, including instructions residing on a computer-readable storage medium, for use in a computer system to control delivery of a transmitted item to a computer in a networked computer system, the instructions causing the computer to:
generate an address identification derived from a randomly generated number;
link said address identification to a machine address identifying a machine;
transmit the address identification with the machine address to an authorized sender;
store said address identification with information identifying said authorized sender;
store policy information associated with the authorized sender in a memory; and
link said policy information to the address identification.

17. The apparatus of claim 16 wherein the machine is a filter.

18. The apparatus of claim 16 wherein the memory comprises a database including a plurality of different address identifications.

19. The apparatus of claim 16, wherein the transmitted item comprises an electronic package.

20. The apparatus of claim 16, wherein the transmitted item comprises information indentifying an electronic package.

21. The apparatus of claim 16 further comprising instructions causing the computer to:
receive an transmitted item;
examine said transmitted item to locate the address identification;
in response to locating the address identification, forward the transmitted item to the destination;
in response to not locating the address identification, not forwarding the transmitted item to the destination.

22. An apparatus, including instructions residing on a computer-readable storage medium, for use in a computer system to control delivery of a transmitted item to a computer in a networked computer system, the instructions causing the computer to:
receive an transmitted item from a sender;
extract a first address identification from the transmitted item;
compare the first address identification to a plurality of address identifications in a memory, each address identification being different, and each address identification having associated policy information;
in response to not matching the first address identification to one of said plurality of address identifications, not forwarding the transmitted item to a destination.

23. The apparatus of claim 22, wherein the transmitted item comprises an electronic package.

24. The apparatus of claim 22, wherein the transmitted item comprises information indentifying an electronic package.

25. The apparatus of claim 22 further comprising instructions causing the computer to:
in response to matching the first address identification to one of said plurality of address identifications, identify policy information associated with the first address identification.

26. The apparatus of claim 25, wherein the policy information comprises a limited use number representing a number of authorized deliveries, and further comprising instruction causing the computer to:

remove the first address identification from memory when the number of transmitted items received that include said first address identification equals said limited use number.

27. The apparatus of claim 25, wherein the policy information comprises an update policy, and further instructions causing the computer to:

forward the transmitted item to a destination;

generate a second address identification;

replace the first address identification in a memory with said second address identification;

transmit said second address identification to the sender of the transmitted item.

28. The apparatus of claim 25, wherein the policy information identifies a sender machine, and further comprising instructions causing the computer to:

forward the transmitted item to the destination in response to locating information identifying said sender machine in the transmitted item.

29. The apparatus of claim 25, wherein the policy information identifies a sender domain, and further comprising instructions causing the computer to:

forward the transmitted item to the destination in response to locating information identifying said sender domain in the transmitted item.

30. The apparatus of claim 25, wherein the policy information identifies a sender encryption key, and further comprising instructions causing the computer to:

forward the transmitted item to the destination in response to locating said sender encryption key in the transmitted item.

31. A filter comprising:

an address generator to generate a first address identification in response to a user command;

a storage device to store a plurality of address identifications including said first address identification, each of said address identifications associated with a particular authorized sender, and to store a plurality of policies, each policy associated with a particular one of said plurality of address identifications; and an authorizer to examine an transmitted item for a second address identification.

32. The filter of claim 31, wherein the authorizer operates to compare the second address identification to the plurality of address identifications in said storage device, and to not forward the transmitted item to a destination in response to not matching the second address identification to one of said plurality of address identifications.

33. The filter of claim 31, wherein the authorizer operates to not forward the transmitted item to a said destination if said transmitted item does not include information corresponding to the policy associated with the address identification included in the transmitted item.

* * * * *